United States Patent
Kim (10) Patent No.: US 10,361,742 B2
(45) Date of Patent: Jul. 23, 2019

(54) CASE HAVING STANDING LEG FOR ELECTRONIC DEVICES

(71) Applicant: SPIGEN KOREA CO., LTD., Seoul (KR)

(72) Inventor: Dae-Young Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 15/589,600

(22) Filed: May 8, 2017

(65) Prior Publication Data

US 2017/0244440 A1    Aug. 24, 2017

Related U.S. Application Data

(63) Continuation of application No. 14/626,670, filed on Feb. 19, 2015, now Pat. No. 9,677,702.

(60) Provisional application No. 62/063,292, filed on Oct. 13, 2014.

(51) Int. Cl.

| | |
|---|---|
| *H04B 1/3888* | (2015.01) |
| *F16M 11/00* | (2006.01) |
| *F16M 11/04* | (2006.01) |
| *F16M 11/10* | (2006.01) |
| *F16M 13/00* | (2006.01) |
| *F16M 13/02* | (2006.01) |
| *A45C 11/00* | (2006.01) |
| *H04B 1/3877* | (2015.01) |

(52) U.S. Cl.
CPC ............ *H04B 1/3888* (2013.01); *A45C 11/00* (2013.01); *F16M 11/00* (2013.01); *F16M 11/041* (2013.01); *F16M 11/10* (2013.01); *F16M 11/105* (2013.01); *F16M 13/00* (2013.01); *F16M 13/022* (2013.01); *H04B 1/3877* (2013.01); *A45C 2011/002* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| | | | | |
|---|---|---|---|---|
| 5,329,712 A | * | 7/1994 | Keller | A47G 1/143 248/558 |
| 7,001,088 B2 | * | 2/2006 | Hui-Hu | G06F 3/0208 248/127 |
| 8,162,283 B1 | * | 4/2012 | Royz | F16M 11/10 248/455 |

(Continued)

*Primary Examiner* — Zhiyu Lu (74) *Attorney, Agent, or Firm* — Heedong Chae; Lucem, PC (57) ABSTRACT

A case having a standing leg for an electronic device includes a soft protective cover, a hard protective frame, and a standing leg. An opening is formed on a back portion of the hard protective frame to receive the standing leg therein. The standing leg is pivoted with the soft protective cover and the hard protective frame. The standing leg is configured to rotate up to about a predetermined angle until the rotation of the standing leg is prevented by a pivoting end wall of the hard protective frame. The opening is sized to receive the standing leg. The standing leg is rotatable from a closed position in which it is received in the opening to an open position in which the standing leg is rotated about the predetermined angle. In an open position, the electronic device rests on a surface at a preferred viewing angle.

19 Claims, 11 Drawing Sheets

(56) References Cited

U.S. PATENT DOCUMENTS

| | | | |
|---|---|---|---|
| D676,854 S * | 2/2013 | Hsu | D14/447 |
| 8,490,789 B2 * | 7/2013 | Lach | A45C 11/00 206/320 |
| D689,502 S * | 9/2013 | Belitz | D14/447 |
| D698,543 S * | 2/2014 | Le Gette | D3/218 |
| 8,693,192 B2 * | 4/2014 | Hsieh | G06F 1/166 248/460 |
| D706,254 S | 6/2014 | Chang | |
| 8,767,395 B2 * | 7/2014 | Yoo | G06F 1/1632 16/252 |
| D712,391 S * | 9/2014 | Kim | D14/250 |
| D718,772 S * | 12/2014 | Westrup | D14/447 |
| 8,978,883 B2 * | 3/2015 | Gandhi | A45C 11/00 206/320 |
| 8,985,543 B2 * | 3/2015 | Chen | A45C 11/00 206/45.24 |
| D732,543 S * | 6/2015 | Westrup | D14/447 |
| 9,137,915 B2 * | 9/2015 | McCurdy | A45C 13/002 |
| 9,194,536 B2 * | 11/2015 | Kim | F16M 13/00 |
| 9,223,347 B2 * | 12/2015 | Hsu | G06F 1/1637 |
| D747,321 S * | 1/2016 | London | D14/440 |
| 9,316,344 B2 * | 4/2016 | Le Gette | F16M 11/041 |
| D755,764 S * | 5/2016 | Dong | D14/250 |
| D755,773 S * | 5/2016 | Kim | D14/250 |
| 9,360,154 B2 * | 6/2016 | Le Gette | F16M 13/00 |
| 9,407,984 B2 * | 8/2016 | Tong | H04R 1/2811 |
| 9,470,358 B2 * | 10/2016 | Le Gette | F16M 11/10 |
| D771,608 S * | 11/2016 | Kim | D14/250 |
| 9,483,083 B1 * | 11/2016 | Zaloom | G06F 1/1679 |
| 2003/0057343 A1 * | 3/2003 | Jacobs | A47B 23/04 248/441.1 |
| 2007/0062089 A1 * | 3/2007 | Homer | G06F 1/1616 40/754 |
| 2008/0006745 A1 * | 1/2008 | Chong | F16M 11/10 248/166 |
| 2009/0017883 A1 * | 1/2009 | Lin | A45C 11/00 455/575.8 |
| 2009/0255772 A1 * | 10/2009 | Sherrell | A45C 5/146 190/18 A |
| 2010/0059649 A1 * | 3/2010 | Buxton | F16M 13/00 248/371 |
| 2010/0142130 A1 | 6/2010 | Wang et al. | |
| 2011/0031287 A1 * | 2/2011 | Le Gette | F16M 11/04 224/101 |
| 2011/0228458 A1 | 9/2011 | Richardson et al. | |
| 2012/0088558 A1 | 4/2012 | Song | |
| 2012/0199501 A1 | 8/2012 | Le Gette et al. | |
| 2012/0217174 A1 | 8/2012 | Ting | |
| 2013/0088813 A1 * | 4/2013 | Su | G06F 1/1628 361/679.01 |
| 2013/0098788 A1 * | 4/2013 | McCarville | A45C 11/00 206/320 |
| 2014/0263939 A1 * | 9/2014 | Rinner | F16M 11/10 248/688 |
| 2014/0347814 A1 * | 11/2014 | Zaloom | G06F 1/1626 361/679.56 |
| 2015/0244408 A1 | 8/2015 | Chen | |
| 2017/0244440 A1 * | 8/2017 | Kim | F16M 11/00 |

* cited by examiner

CASE HAVING STANDING LEG FOR ELECTRONIC DEVICES

CROSS-REFERENCE TO RELATED APPLICATIONS

This application is a continuation of and claims priority to U.S. patent application Ser. No. 14/626,670, filed Feb. 19, 2015, which claims priority to U.S. provisional patent application No. 62/063,292 filed Oct. 13, 2014, which is incorporated herein by reference.

FIELD OF THE INVENTION

The present invention relates to a case having a standing leg for an electronic device and, more particularly, to a smart phone case having a standing leg for propping up the smart phone case. The standing leg is pivoted with both of the soft protective case and the hard protective frame of the case.

BACKGROUND OF THE INVENTION

Mobile electronic devices such as mobile phones, smart phones, tablet computers and the like are in wide use around the world. A user grips such device in his hand or hands to use it and uses his fingers to use various applications of the device. However, while using the device, the user may accidentally drop the device thereby causing damage to the device. In addition, use of mobile electronic devices may cause hand, limb and back problems due to the physical stress of holding the electronic device for an extended period of time.

Users of the mobile electronic devices use cases to protect their devices and manufacturers have produced different types of cases to help the users keep their mobile devices safe. However, certain of these cases do not allow a user to prop up the mobile device for hands-free viewing at a comfortable angle. Even if such function is allowed, the propping up structure is often complicated and inconvenient.

Therefore, to solve the above problems, there is a need for a case having an easy-to-use standing leg for an electronic device constructed in a simple and durable structure. This invention is directed to solve these problems and satisfy the long-felt need.

SUMMARY OF THE INVENTION

The present invention contrives to solve the disadvantages of the prior art. The present invention provides a case having a standing leg for an electronic device such as a mobile phone, smart phone, tablet computer and the like, and, more particularly, to a standing leg pivoted not just with the hard protective frame of the case but also with the soft protective case of the case.

The object of the present invention is to provide a case having a standing leg for an electronic device, including a soft protective cover, a hard protective frame, and a standing leg. An opening is formed on a back portion of the hard protective frame to receive the standing leg therein. The standing leg is pivoted with the soft protective cover and the hard protective frame. The standing leg is configured to rotate up to about a predetermined angle until the rotation of the standing leg is prevented by a pivoting end wall of the hard protective frame.

Another object of the present invention is to provide a case having a standing leg for an electronic device such that the opening is sized to receive the standing leg. The standing leg is rotatable from a closed position in which it is received in the opening to an open position in which the standing leg is rotated about the predetermined angle. In an open position, the electronic device may rest on a surface at a preferred viewing angle.

The advantages of the present invention are: (1) the case of the present invention has a simple, stylish structure of a standing leg for propping up the case; (2) the standing leg is easy-to-use and convenient; (3) the standing leg is more durable and less vulnerable to scratches or damages because the standing leg is pivoted not just with the hard protective frame of the case but also with the soft protective case of the case; (4) once a mobile phone is received and secured in the case, the standing leg is very securely pivoted and the opening and closing of the standing leg is very convenient; (5) the soft protective cover, hard protective frame and standing leg are very easy to assemble and the standing leg is easy to be replaced; (6) the surface of the standing leg is flush with the surface of the hard protective frame and the appearance and finish are stylish; and (7) the standing leg can be open conveniently by using a fingernail and the operation is easy.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
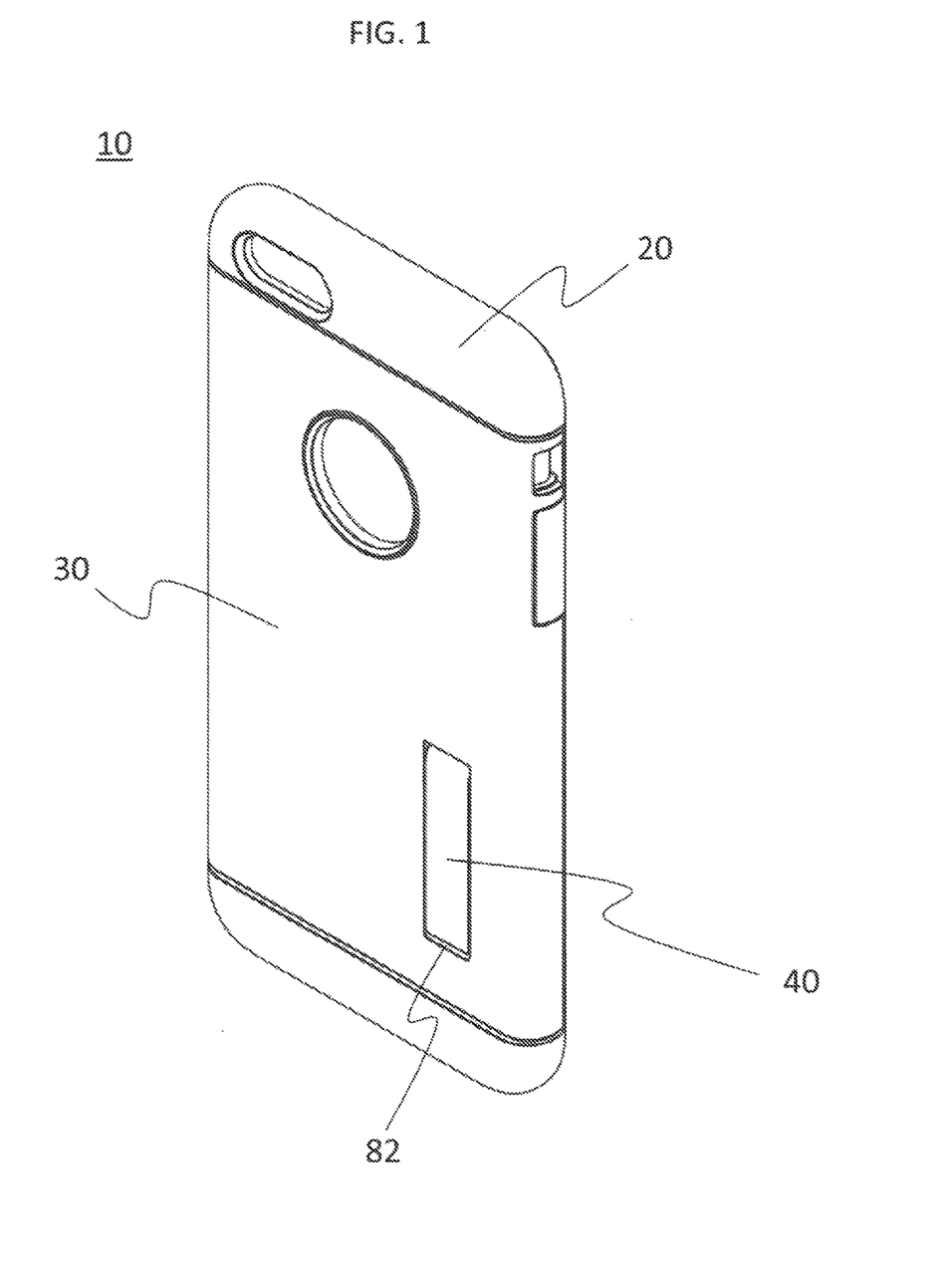
FIG. 1 shows a perspective view of a case having a standing leg according to one embodiment of the present invention.
Figure 2:
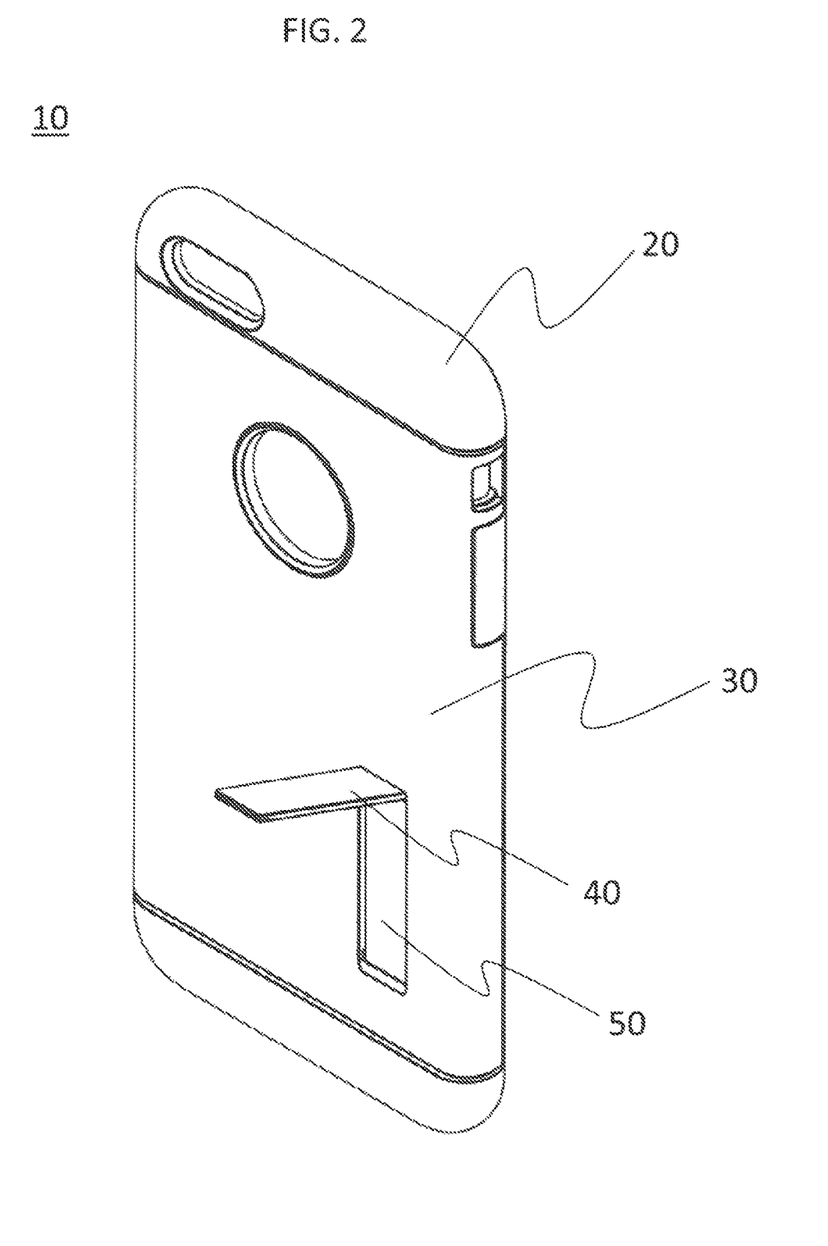
FIG. 2 shows a perspective view of the case with the standing leg in an open position according to the present invention.
Figure 3:
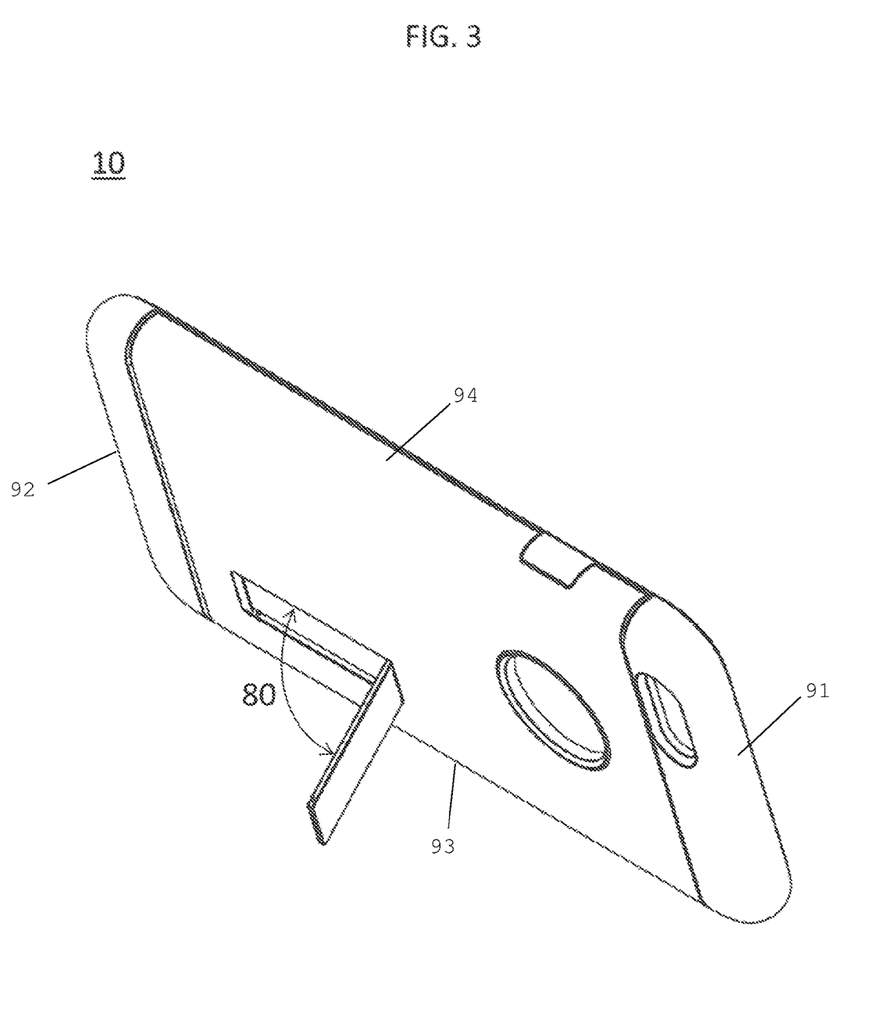
FIG. 3 shows another perspective view of the case with the standing leg open to prop up the case and an electronic device therein in a landscape orientation.
Figure 4:
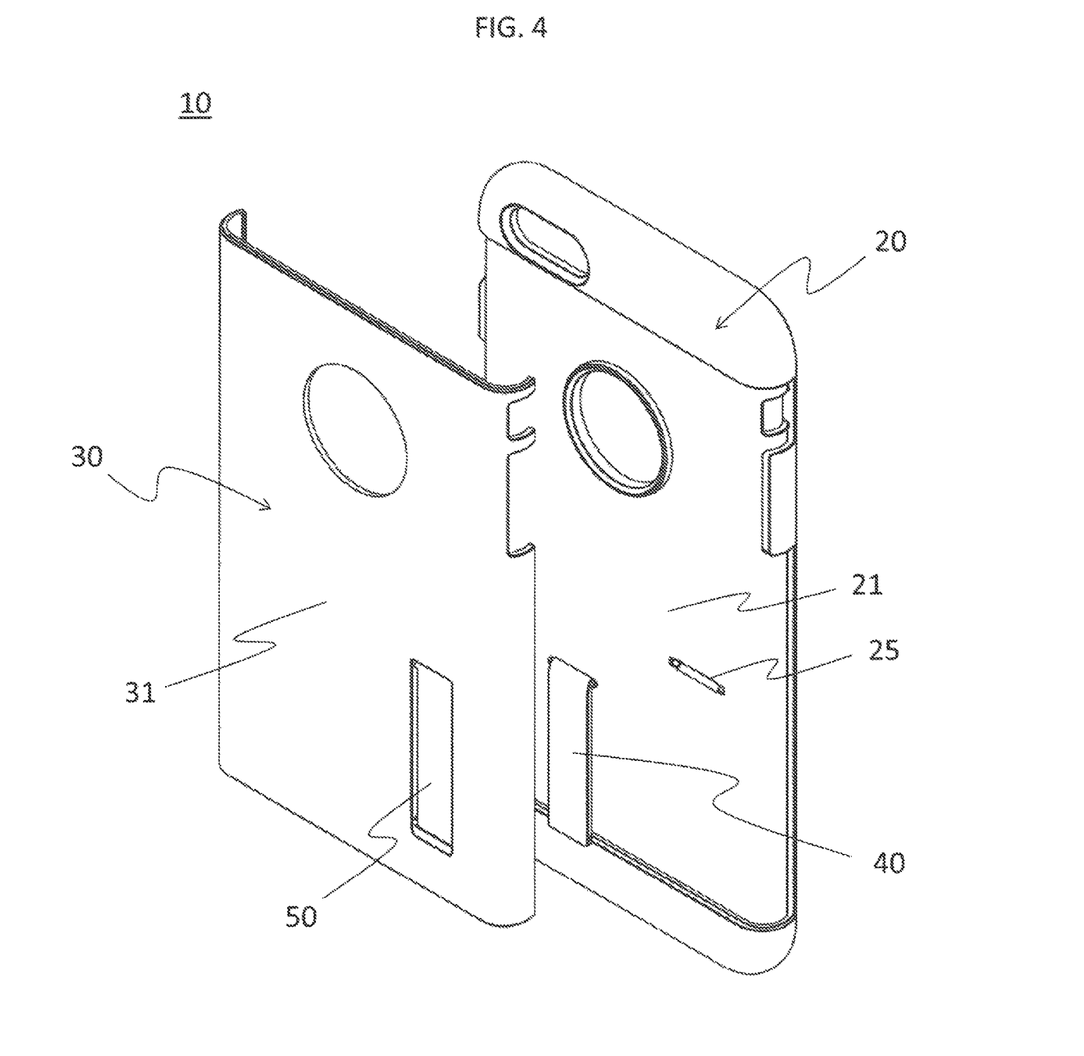
FIG. 4 shows an exploded view of the case having a soft protective cover, a hard protective frame and a standing leg according to the present invention.

FIG. 1 shows a perspective view of a case 10 having a standing leg 40 and FIG. 2 shows the case 10 when the standing leg 40 is in an open position. FIG. 3 shows the case 10 when the standing leg 40 is in an open position to prop up the case 10 and an electronic device 100 (not shown) therein in a landscape orientation. In addition, FIG. 4 shows an exploded view of the case 10 having a soft protective cover 20, a hard protective frame 30 and a standing leg 40 according to one embodiment of the present, invention. The electronic device may be a mobile phone, smart phone, tablet computer, MP3 player, Personal Digital Assistant or the like.

The case 10 of the present invention, having a standing leg 40 for an electronic device 100, comprises a soft protective cover 20, a hard protective frame 30, and a standing leg 40. The soft protective cover 20 protects the electronic device 100 installed therein and covers a back portion 110 of the electronic device 100. The hard protective frame 30 is configured to removably mount over the soft protective cover 20 and the standing leg 40 props up the electronic device. An opening 50 is formed on a back portion 31 of the hard protective frame 30 and the standing leg 40 fits in the opening 50. Furthermore, the standing leg 40 is configured to rotate up to about a predetermined angle 80.

In a preferred embodiment, the soft protective cover 20 substantially covers the entire electronic device 100 (not shown) except for the screen side or front portion and providing cutout portions to allow for access to certain portions of the electronic device such as a camera lens, various ports, switches, and the like.

When the standing leg 40 is in an open position, the case 10 props up the electronic device 100 on a flat surface at a preferred viewing angle.

The opening 50 is sized to receive the standing leg 40 The standing leg 40 is rotatable from a closed position in which it is received in the opening 50 to an open position in which the standing leg 40 is rotated about the predetermined angle 80 so that the electronic device 100 may rest on a surface at a preferred viewing angle.

The standing leg 40 is pivoted with the soft protective cover 20 or the hard protective frame 30. Preferably, the standing leg 40 is pivoted with both of the soft protective cover 20 and the hard protective frame 30. Alternatively, the standing leg 40 may be pivoted either with the soft protective cover 20 or with the hard protective frame 30.

Figure 5:
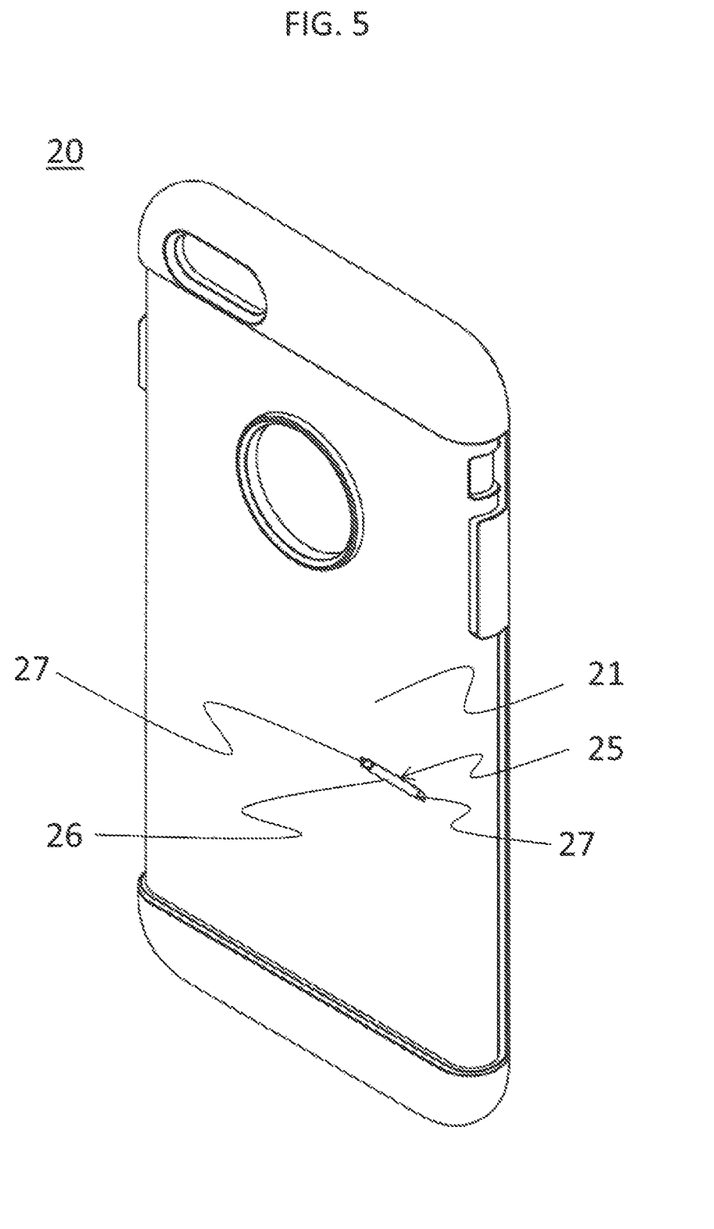
FIG. 5 shows a perspective view of the soft protective cover.
Figure 6:
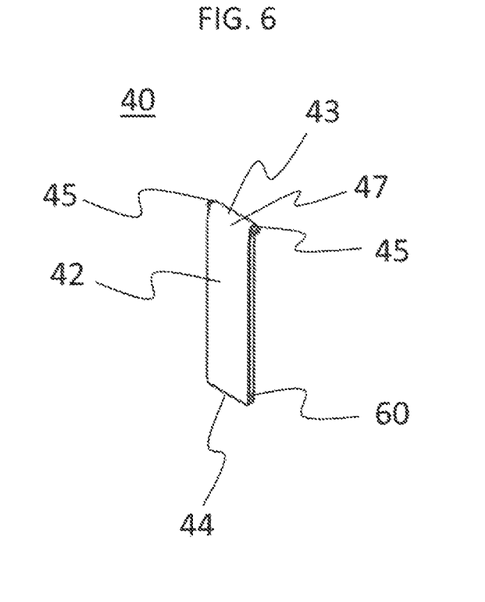
FIG. 6 shows a perspective view of the standing leg.
Figure 7:
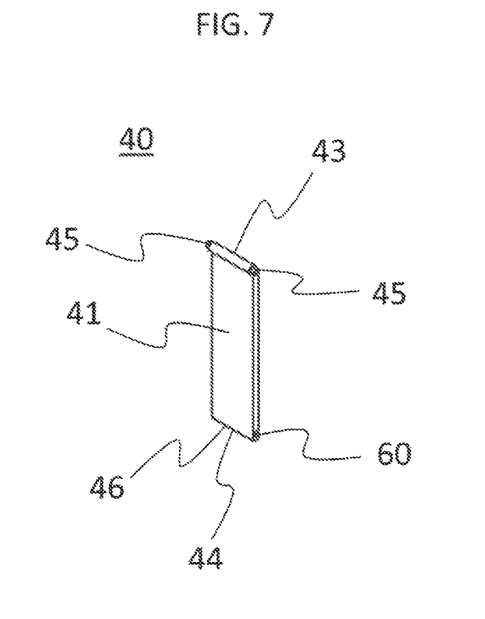
FIG. 7 shows another perspective view of the standing leg.
Figure 8:
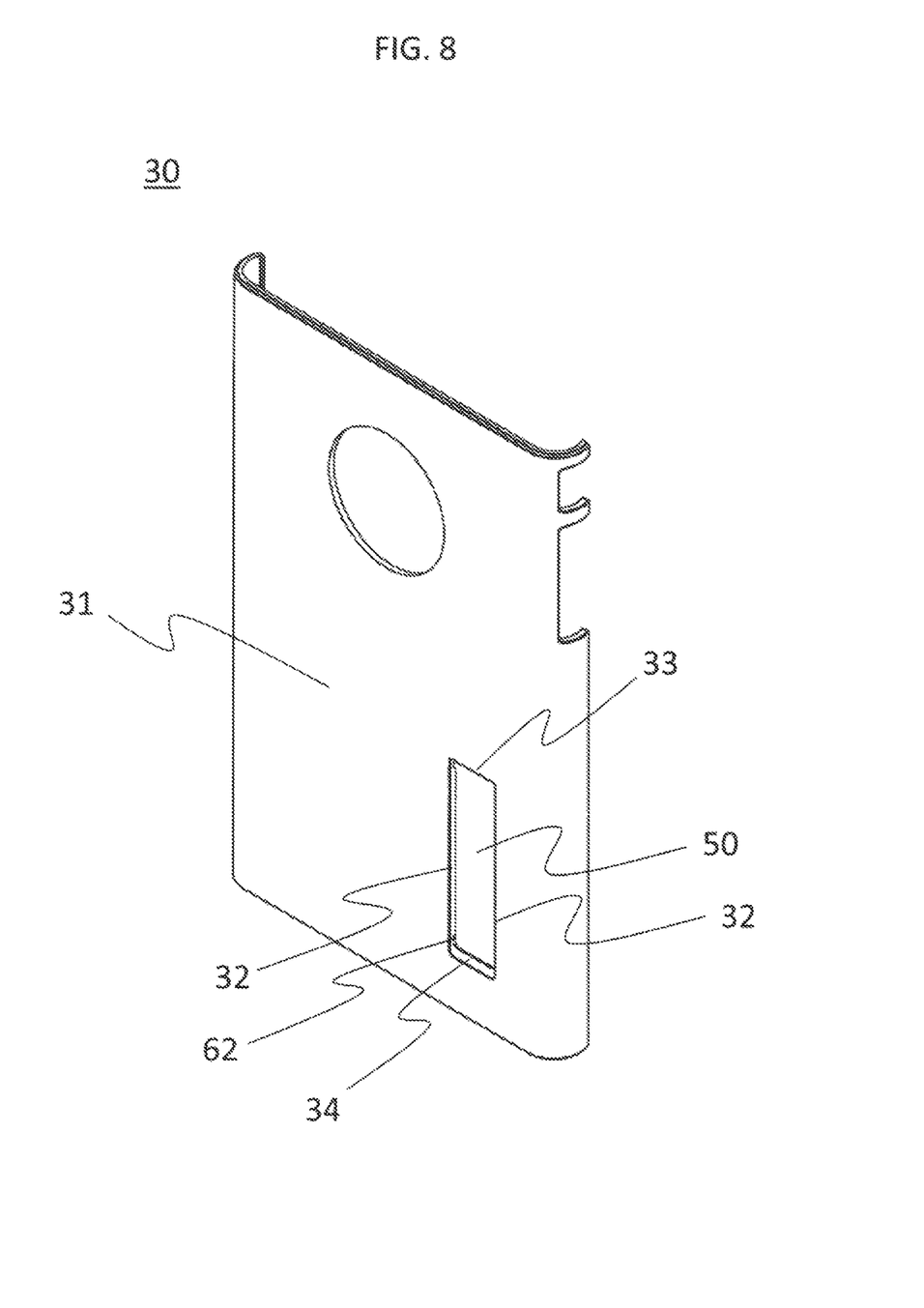
FIG. 8 shows a perspective view of the hard protective frame.
Figure 9:
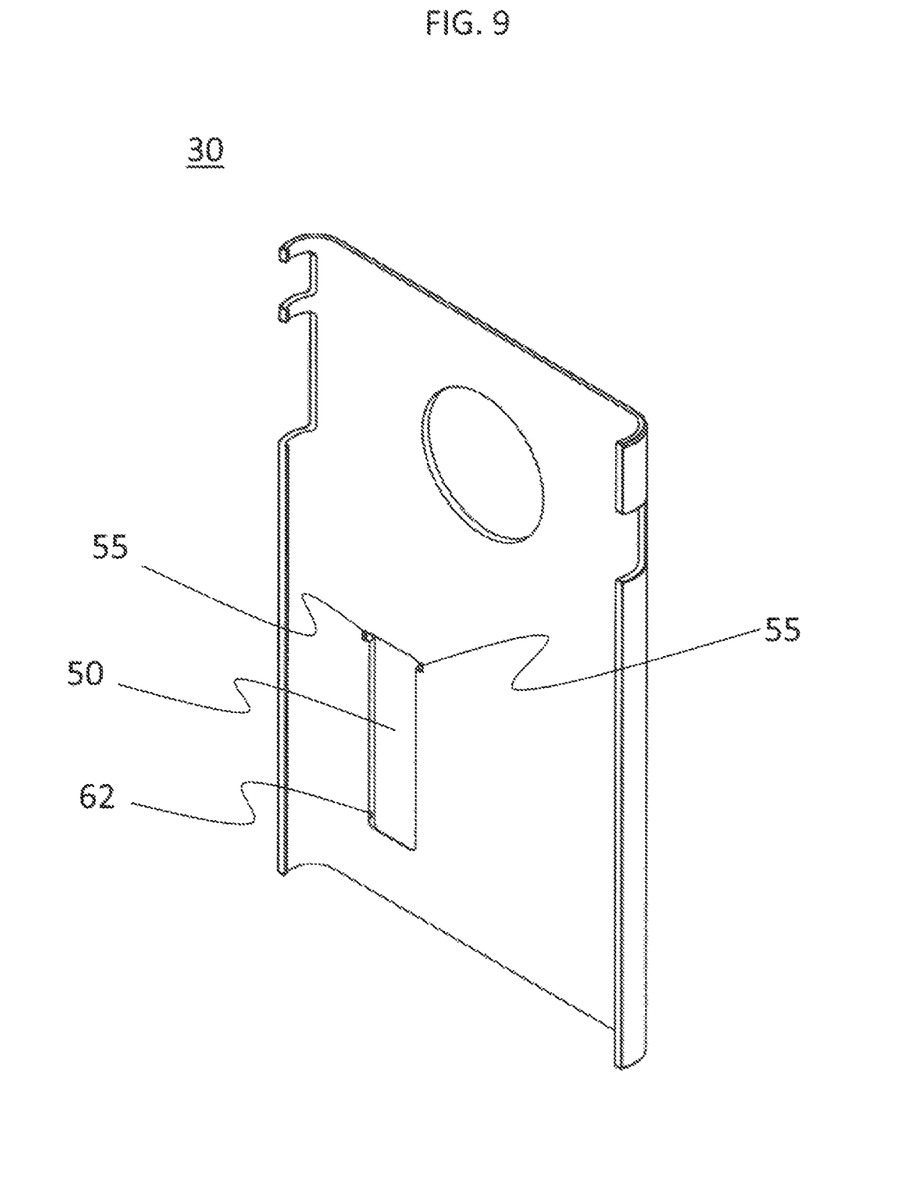
FIG. 9 shows another perspective view of the hard protective frame.

FIG. 5 shows a perspective view of the soft protective cover 20 and FIGS. 6 and 7 show perspective views of the standing leg 40. In addition, FIGS. 8 and 9 show perspective views of the hard protective frame 30.

The standing leg 40 includes a pivoting end 43 and the soft protective cover 20 includes a pivoting groove 25 formed on a back portion 21 of the soft protective cover 20. In addition, the pivoting end 43 comprises projections 45 formed on both ends of the pivoting end 43 and the pivoting groove 25 receives the projections 45. In addition to the projections 45, the pivoting end 43 may fit in the pivoting groove 25. The projections 45 define a pivot axis for the standing leg 40.

The hard protective frame 30 may further include pivoting recesses 55 formed on side walls 32 of the opening 50 in that the pivoting recesses 55 receives the projections 45.

As in FIG. 5, the pivoting groove 25 may comprise a body portion 26 and two end portions 27 such that the two projections 45 fit in the end portions 27 and the pivoting recesses 55. Preferably, an end portion 27 and a pivoting recess 55 form a cylinder to receive a cylindrical projection 45 therein. In addition, the pivoting end 43 pivots in the pivoting groove 25. The pivoting groove 25 is made of soft material and helps smooth rotation of the standing leg 40.

Preferably, the pivoting groove 25 is rounded or circular and a diameter of the body portion 26 is greater than a diameter of the end portions 27.

The hard protective frame 30 is configured to removably mount over the soft protective cover 20, and when the hard protective frame 30 mounts over the soft protective cover 20, the standing leg 40 is placed within the opening 50 and the projections 45 are received in the pivoting recesses 55. Then, the projections 45 act as a hinge for the standing leg 40. In this manner, the standing leg 40 can be easily replaced should it get damaged or worn down in the future.

The projections 45 may be formed on both ends of the pivoting end 43 by molding the standing leg 40 and the projections 45 together. Alternatively, a shaft may be inserted into a shaft through-hole (not shown) formed on the pivoting end 43 of the standing leg 40.

The standing leg 40 comprises an inner surface 41 and an outer surface 42, and the hard protective frame 30 comprises a pivoting end wall 33, two side walls 32 and a distal end wall 34. As shown in FIG. 8, the pivoting end wall 33, two side walls 32 and distal end wall 34 form the opening 50.

Figure 10:
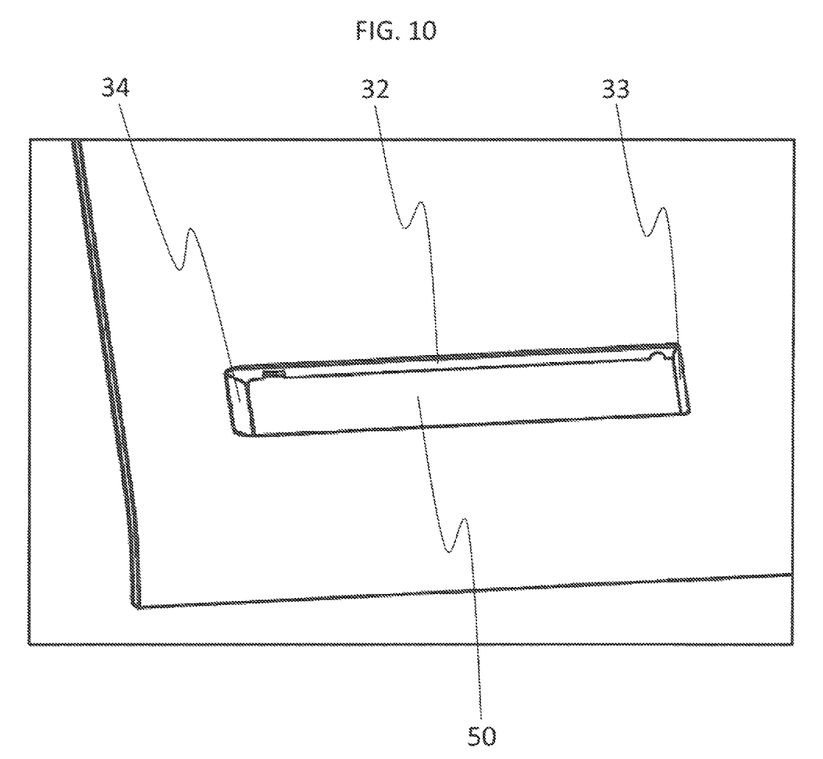
FIG. 10 shows a partial perspective view of the hard protective frame showing the opening of the hard protective frame.

FIG. 10 shows a partial perspective view of the hard protective frame 30 showing the opening 50 of the hard protective frame 30.

The standing leg 40 is configured to rotate about the predetermined angle 80 until a contact part 47 of the outer surface 42 contacts the pivoting end wall 33, the standing leg being prevented from rotation by the pivoting end wall 33. Preferably, the predetermined angle 80 is more than 90 degrees. As in FIG. 3, if the predetermined angle 80 is more than 90 degrees, the standing leg 40 does not rotate back toward the opening 50 while propping up the case 10 and the electronic device 100 (not shown) because of the weight of the case and the electronic device 100. The weight presses the standing leg 40 to rotate away from the opening 50.

Preferably, the contact part 47 of the standing leg 40 is sloped and the pivoting end wall 33 is sloped such that the contact part 47 is in planar contact with the pivoting end wall 33 when the standing leg 40 is rotated about the predetermined angle 80. Such planar contact provides wider contact area than linear or point contact, and thus, scratch or damage to the standing leg 40 or the pivoting end wall 33 can be minimized. In addition, the pivoting end wall 33 can provide stable and reliable support to the standing leg 40 in an open position. In addition, by adjusting the slopes of the pivoting end wall 33 and the contact part 47, the predetermined angle 80 can be adjusted.

A mating protrusion 60 may be formed on the standing leg 40 and a mating cavity 62 may be formed on the side wall 33 such that the mating protrusion 60 is mated with the mating cavity 62. Alternatively, a mating protrusion 60 may be formed on the side wall 33 and a mating cavity 62 may be formed on the standing leg 40 such that the mating protrusion 60 is mated with the mating cavity 62. Preferably, there are two mating protrusions 60 and two mating cavities 62 on opposite sides of the standing leg 40. In a closed position, the standing leg 40 is held in place by the mating between the mating protrusion 60 and mating cavity 62.

When the standing leg 40 is in a closed position, substantial portion of the inner surface 41 of the standing leg 40 is in contact with the back portion 21 of the soft protective case 20. The back portion 21 of the soft protective case 20 is soft and thus, scratch or damage to the standing leg 40 is prevented. Furthermore, when the standing leg 40 is in a closed position, the outer surface 42 of the standing leg 40 is substantially flush with the back portion 31 of the hard protective frame 30 and this construction provides a stylish look and feel of the case 10.

The distal end wall 34 may be sloped and there may be a gap 82 between the distal end wall 34 and a distal end 44 of the standing leg 40 for easy insertion of a user's fingernail into the gap to open the standing leg 40. A user may insert his fingernail into the gap 82 and open the standing leg 40 locked by the mating between the mating protrusion 60 and mating cavity 62. Then, the user may rotate the standing leg 40 about the predetermined angle 80 until such rotation is stopped by the pivoting end wall 33.

A recess or a slope 46 may be formed on the distal end 44 of the standing leg 40 for easy insertion of a user's fingernail into the gap 82 to open the standing leg 40. In addition to the sloped distal end wall 34, the recess or slope 46 formed on the distal end 44 makes the gap 82 bigger for easy insertion of a fingernail.

Because of this construction for the gap 82, the standing leg 40 does not require a knob, lever or handle to open it. Without a knob, lever or handle, the standing leg 40 and the case 10 can be designed more stylish.

An emblem, a trademark, a slogan, or an insignia may be formed on an inner surface 41 of the standing leg 40. Additionally, an emblem, a trademark, a slogan, or an insignia may be formed on a back portion 21 of the soft protective case 20 corresponding to a location of the opening 50. An emblem, a trademark, a slogan, or an insignia may be formed on an outer surface 42 of the standing leg 40 as well.

The inner surface 41 and the back portion 21 of the soft protective case 20 corresponding to a location of the opening 50 may be patterned to provide additional grip as well as aesthetic design.

The soft protective cover 20 is made of a soft material and the hard protective frame 30 is made of a hard material. Preferably, the soft protective cover 20 is made of an elastic material.

The soft material may be an elastomeric resilient material, for example, thermoplastic polyurethane (TPU) or other thermoplastic elastomers having a similar durometer hardness. The hard material may include a substantially rigid material, for example, polycarbonate (PC) or a similarly rigid material having a similar durometer hardness greater than the durometer hardness of the soft material.

The hard protective frame 30 may be made of polyvinyl chloride (PVC), titanium, aluminum, graphite composite, metal, plastic or other suitable materials. Preferably, the soft protective cover 20 is made of thermoplastic polyurethane and the hard protective frame 30 is made of polycarbonate.

Figure 11:
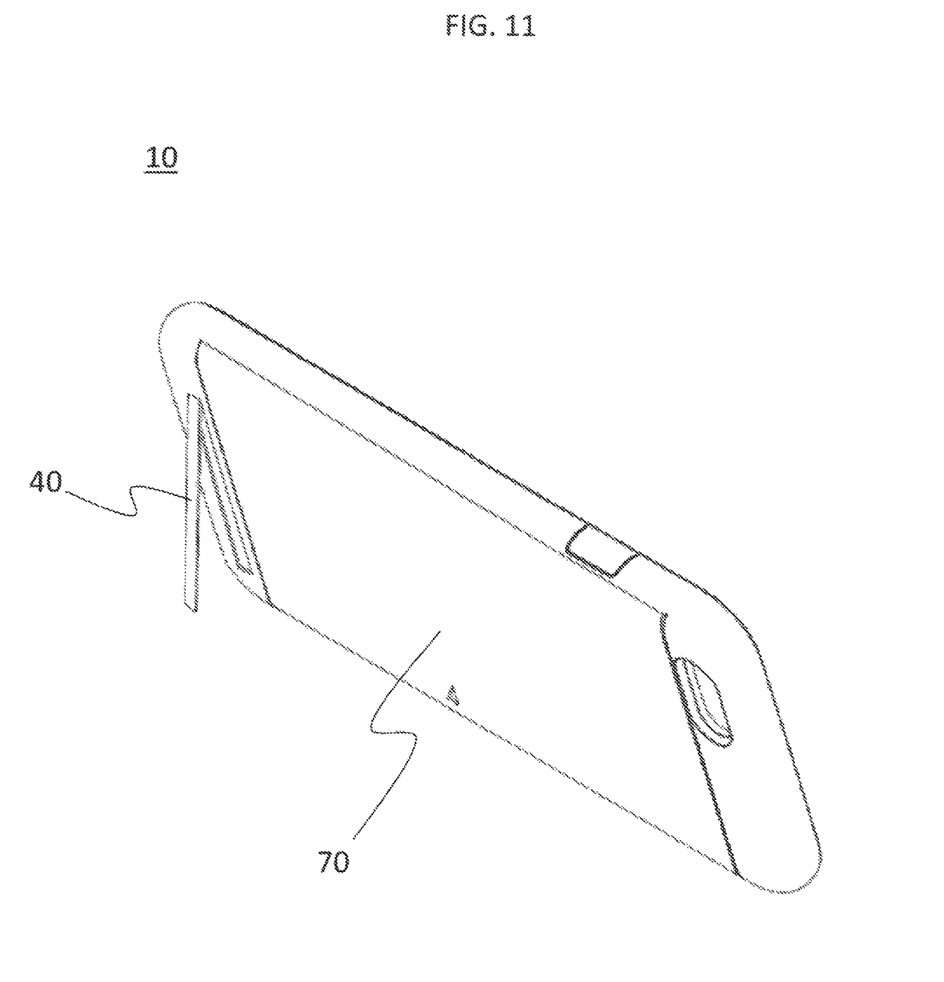
FIG. 11 shows a perspective view of the case with a standing leg open to prop up the case according to another embodiment of the present invention.
Figure 12:
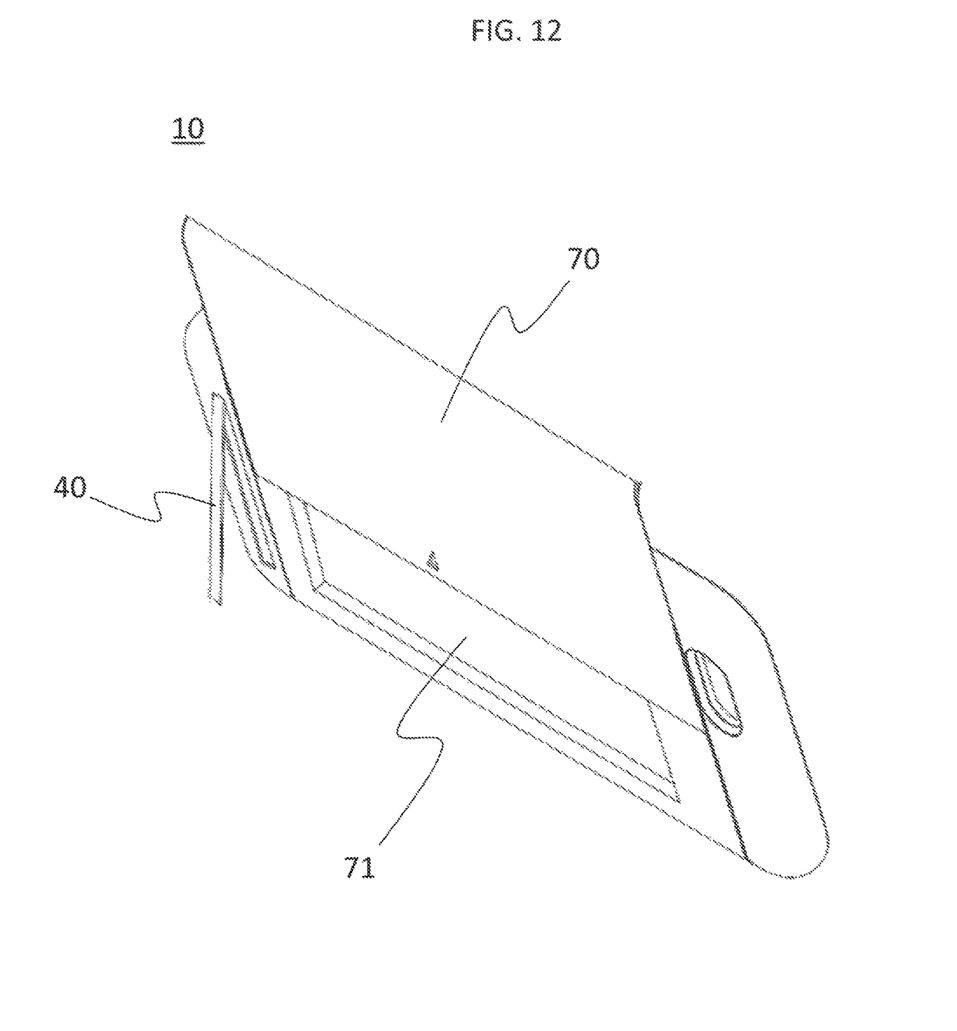
FIG. 12 shows another perspective view of the case with a standing leg open to prop up the case according to another embodiment of the present invention.

FIG. 11 shows a perspective view of the case with a standing leg 40 open to prop up the case 10 in a landscape orientation according to another embodiment of the present invention and FIG. 12 shows the case when the cover 70 is open.

A credit card storage space 71 is formed between the soft protective cover 20 and the hard protective frame 30. The cover 70 opens and closes the storage space 71. The standing leg 40 is pivoted with an opening 50 formed on the hard protective frame 30, preferably next to the cover 70. As in FIG. 12, even if the cover 70 is open, the case 10 can stand by the support of the standing leg 40.

Here, the predetermined angle 80 can be any angle, but preferably smaller than 90 degrees. By adjusting the slopes of the pivoting end wall 33 and the contact part 47, the predetermined angle 80 can be adjusted. For the predetermined angle 80 to be smaller than 90 degrees, the angle between the pivoting end wall 33 and the bottom of the soft protective cover 20 corresponding to the opening 50 needs to be a sharp one, smaller than 90 degrees.

FIGS. 5, 10 and 11 show the case 10 propped up in a landscape orientation. However, the present invention also covers the case 10 propped up in a portrait orientation.

FIG. 3 shows the case 10 where the predetermined angle 80 is greater than 90 degrees. Here, the case 10 includes a soft protective cover 20 for protecting the electronic device 100 installed therein, covering a back portion 110 of the electronic device 100; a hard protective frame 30, constructed to removably mount over the soft protective cover 20; a standing leg 40 for propping up the electronic device 100; and an opening 50 formed on a back portion 31 of the hard protective frame 30 wherein the standing leg 40 fits in the opening 50. The standing leg 40 is configured to rotate up to about a predetermined angle 80, and the standing leg 40 is pivoted with the soft protective cover 20 and the hard protective frame 30. Additionally, the standing leg 40 includes a pivoting end 43 and the soft protective cover 20 includes a pivoting groove 25 formed on a back portion 21 of the soft protective cover 20. The pivoting end 43 comprises projections 45 formed on both ends of the pivoting end 43 and the pivoting groove 25 receives the projections 45. Furthermore, the hard protective frame 30 comprises pivoting recesses 55 formed on side walls 32 of the opening 50 and the pivoting recesses 55 receive the projections 45. Installing the electronic device 100 in the case 10 increases frictional resistance at the pivoting end 43 and prevents the standing leg 40 from pivoting freely, and the standing leg 40 can be removed from the case 10 and replaced.

Besides, the soft protective cover 20 comprises a top side 91, a bottom side 92, a first side 93 and a second side 94. The top and bottom sides 91, 92 of the soft protective cover 20 face each other, and the first and second sides 93, 94 of the soft protective cover 20 face each other. In addition, the first and second sides 93, 94 of the soft protective cover 20 are longer than the top and bottom sides 91, 92 of the soft protective cover 20. In other words, the top and bottom sides 91, 92 can be exchanged and the first and second sides 93, 94 can be exchanged as well. The opening 50 is formed on a location of the hard protective frame 30 closer to the first side 93 of the soft protective cover 20 than the second side 94 of the soft protective cover 20. The pivoting end 43 of the standing leg 40 is closer to a middle point of the first side 93 of the soft protective cover 20 than a distal end 44 of the standing leg 40, and the opening 50 is formed substantially parallel to the first and second sides 93, 94 of the soft protective cover 20. The predetermined angle is greater than 90 degrees. The middle point of the first side 93 means the center of the first side 93.

In the embodiment of FIG. 3 where the predetermined angle 80 is greater than 90 degrees, the standing leg 40 effectively props up the case 10 approximately in the middle of the case 10, and the standing leg 40 is not forced to be closed by the weight of the case 10 and electronic device 100. If the predetermined angle 80 is small than 90 degree, the standing leg 40 may be closed by the weight of the case 10 and electronic device 100 and may not effectively prop up the case 10.

The pivoting groove 25 may comprise end portions 27 and may further comprise a body portion 26.

In the alternative embodiment as in FIGS. 11 and 12, the predetermined angle 80 may be smaller than 90 degrees. Here, the case 10 includes a soft protective cover 20 for protecting the electronic device installed 100 therein, covering a back portion 110 of the electronic device 100; a hard protective frame 30, constructed to removably mount over the soft protective cover 20; a standing leg 40 for propping up the electronic device 100; and an opening 50 formed on a back portion 31 of the hard protective frame 30 wherein the standing leg 40 fits in the opening 50. The standing leg 40 is configured to rotate up to about a predetermined angle 80, and the standing leg 40 is pivoted with the soft protective cover 20 and the hard protective frame 30. Additionally, the standing leg 40 includes a pivoting end 43 and the soft protective cover 20 includes a pivoting groove 25 formed on a back portion 21 of the soft protective cover 20. The pivoting end 43 comprises projections 45 formed on both ends of the pivoting end 43 and the pivoting groove 25 receives the projections 45. Furthermore, the hard protective frame 30 comprises pivoting recesses 55 formed on side walls 32 of the opening 50 and the pivoting recesses 55 receive the projections 45. Installing the electronic device 100 in the case 10 increases frictional resistance at the pivoting end 43 and prevents the standing leg 40 from pivoting freely, and the standing leg 40 can be removed from the case 10 and replaced.

Besides, the soft protective cover 20 comprises a top side 91, a bottom side 92, a first side 93 and a second side 94. The top and bottom sides 91, 92 of the soft protective cover 20 face each other, the first and second sides 93, 94 of the soft protective cover 20 face each other, and the first and second sides 93, 94 of the soft protective cover 20 are longer than the top and bottom sides 91, 92 of the soft protective cover 20. In other words, the top and bottom, sides 91, 92 can be exchanged and the first and second sides 93, 94 can be exchanged as well. The opening 50 is formed substantially parallel to the top and bottom sides 91, 92 of the soft protective cover 20, and wherein the predetermined angle 80 is smaller than 90 degrees. In the embodiment of FIGS. 11 and 12, the predetermined angle 80 needs to be smaller than 90 degrees to provide a proper viewing angle of the electronic device 100.

The pivoting groove 25 may comprise end portions 27 and may further comprise a body portion 26.

In the alternative embodiment, the case 10 for an electronic device 100, comprises: a standing leg 40 for propping up the case 10 and the electronic device 100, and an opening 50 formed on a back portion of the case 10 wherein the standing leg 40 fits in the opening 50. The standing leg 40 is pivoted with the case 10, and the standing leg 40 comprises a pivoting end 43 and a distal end 44. The standing leg 40 is configured to rotate up to about a predetermined angle 80, and the predetermined angle 80 is greater than 90 degrees. The case 10 comprises a top side 91, a bottom side 92, a first side 93 and a second side 94. The top and bottom sides 91, 92 of the case 10 face each other, the first and second sides 93, 94 of the case 10 face each other, and the first and second sides 93, 94 of the case 10 are longer than the top and bottom sides 91, 92 of the case 10. In other words, the top and bottom sides 91, 92 can be exchanged and the first and second sides 93, 94 can be exchanged as well. The opening 50 is formed on a location of the case 10 closer to the first side 93 of the case 10 than the second side 94 of the case 10. In addition, the pivoting end 43 of the standing leg 40 is closer to a middle point of the first side 93 of the case 10 than the distal end 44 of the standing leg 40. The opening 50 is formed substantially parallel to the first and second sides 93, 94 of the case 10.

In the embodiment of FIG. 3 where the predetermined angle 80 is greater than 90 degrees, the standing leg 40 effectively props up the case 10 approximately in the middle of the case 10, and the standing leg 40 is not forced to be closed by the weight of the case 10 and electronic device 100. If the predetermined angle 80 is small than 90 degree, the standing leg 40 may be closed by the weight of the case 10 and electronic device 100 and may not effectively prop up the case 10.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case having a standing leg for an electronic device, comprising:
   a soft protective cover for protecting the electronic device installed therein, covering a back portion of the electronic device;
   a hard protective frame, constructed to removably mount over the soft protective cover;
   a standing leg for propping up the electronic device; and
   an opening formed on a back portion of the hard protective frame wherein the standing leg fits in the opening,
   wherein the standing leg is configured to rotate up to about a predetermined angle,
   wherein the standing leg is pivoted with the soft protective cover and the hard protective frame,
   wherein the standing leg comprises a pivoting end and the soft protective cover comprises a pivoting groove formed on a back portion of the soft protective cover,
   wherein the pivoting end comprises projections formed on both ends of the pivoting end and the pivoting groove receives the projections,
   wherein the hard protective frame comprises pivoting recesses formed on side walls of the opening wherein the pivoting recesses receive the projections,
   wherein the projections are pivotably disposed between the pivoting groove and the pivoting recesses,
   wherein installing the electronic device in the case increases frictional resistance at the pivoting end and prevents the standing leg from pivoting freely,
   wherein the standing leg can be removed from the case and replaced,
   wherein the soft protective cover comprises a top side, a bottom side, a first side and a second side,
   wherein the top and bottom sides of the soft protective cover face each other, the first and second sides of the soft protective cover face each other, and the first and second sides of the soft protective cover are longer than the top and bottom sides of the soft protective cover,
wherein the pivoting groove includes a length dimension substantially parallel to the top side and the bottom side,
wherein the opening is formed on a location of the hard protective frame closer to the first side of the soft protective cover than the second side of the soft protective cover,
wherein the pivoting end of the standing leg is closer to a middle point of the first side of the soft protective cover than a distal end of the standing leg,
wherein the opening is formed substantially parallel to the first and second sides of the soft protective cover,
wherein the predetermined angle is greater than 90 degrees.

2. The case of claim 1, wherein the pivoting end fits in the pivoting groove.

3. The case of claim 2, wherein the pivoting groove comprises a body portion and end portions,
wherein the projections fit in the end portions and the pivoting recesses,
wherein the pivoting groove is circular and a diameter of the body portion is greater than a diameter of the end portions.

4. The case of claim 1, wherein the standing leg comprises an inner surface and an outer surface, wherein the hard protective frame comprises a pivoting end wall, the two side walls and a distal end wall configured to form the opening.

5. The case of claim 4, wherein the standing leg is configured to rotate about the predetermined angle until a contact part of the outer surface contacts the pivoting end wall, and wherein the contact part is sloped and the pivoting end wall is sloped such that the contact part is in planar contact with the pivoting end wall when the standing leg is rotated about the predetermined angle.

6. The case of claim 4, wherein a mating protrusion is formed on the standing leg and a mating cavity is formed on the side wall wherein the mating protrusion is mated with the mating cavity.

7. The case of claim 4, wherein a mating protrusion is formed on the side wall and a mating cavity is formed on the standing leg wherein the mating protrusion is mated with the mating cavity.

8. The case of claim 4, wherein when the standing leg is in a closed position, substantial portion of the inner surface of the standing leg is in contact with the back portion of the soft protective case,
wherein when the standing leg is in a closed position, the outer surface of the standing leg is substantially flush or co-planar with the back portion of the hard protective frame.

9. The case of claim 4, wherein the distal end wall is sloped and there is a gap between the distal end wall and the distal end of the standing leg for easy insertion of a user's fingernail into the gap to open the standing leg,
wherein a recess or a slope is formed on the distal end of the standing leg for easy insertion of a user's fingernail into the gap to open the standing leg.

10. The case of claim 1, wherein the soft protective cover is made of a soft material and the hard protective frame is made of a hard material.

11. The case of claim 10, wherein the hard protective frame is made of polyvinyl chloride (PVC), titanium, aluminum, graphite composite, metal, plastic, or polycarbonate, wherein the soft protective cover is made of thermoplastic polyurethane.

12. A case having a standing leg for an electronic device, comprising:
a soft protective cover for protecting the electronic device installed therein, covering a back portion of the electronic device;
a hard protective frame, constructed to removably mount over the soft protective cover;
a standing leg for propping up the electronic device; and
an opening formed on a back portion of the hard protective frame wherein the standing leg fits in the opening,
wherein the standing leg is configured to rotate up to about a predetermined angle,
wherein the standing leg is pivoted with the soft protective cover and the hard protective frame,
wherein the standing leg comprises a pivoting end and the soft protective cover comprises a pivoting groove formed on a back portion of the soft protective cover,
wherein the projections are pivotably disposed between the pivoting groove and the pivoting recesses,
wherein the pivoting end comprises projections formed on both ends of the pivoting end and the pivoting groove receives the projections,
wherein the hard protective frame comprises pivoting recesses formed on side walls of the opening wherein the pivoting recesses receive the projections,
wherein installing the electronic device in the case increases frictional resistance at the pivoting end and prevents the standing leg from pivoting freely,
wherein the standing leg can be removed from the case and replaced,
wherein the soft protective cover comprises a top side, a bottom side, a first side and a second side,
wherein the top and bottom sides of the soft protective cover face each other, the first and second sides of the soft protective cover face each other, and the first and second sides of the soft protective cover are longer than the top and bottom sides of the soft protective cover,
wherein the pivoting groove includes a length dimension substantially parallel to the first and second sides,
wherein the opening is formed substantially parallel to the top and bottom sides of the soft protective cover,
wherein the predetermined angle is smaller than 90 degrees.

13. The case of claim 12, wherein the pivoting end fits in the pivoting groove.

14. The case of claim 13, wherein the pivoting groove comprises a body portion and end portions,
wherein the projections fit in the end portions and the pivoting recesses,
wherein the pivoting groove is circular and a diameter of the body portion is greater than a diameter of the end portions.

15. The case of claim 12, wherein the standing leg comprises an inner surface and an outer surface,
wherein the hard protective frame comprises a pivoting end wall, the two side walls and a distal end wall configured to form the opening.

16. The case of claim 15, wherein the standing leg is configured to rotate about the predetermined angle until a contact part of the outer surface contacts the pivoting end wall, and wherein the contact part is sloped and the pivoting end wall is sloped such that the contact part is in planar contact with the pivoting end wall when the standing leg is rotated about the predetermined angle.

17. The case of claim 15, wherein a mating protrusion is formed on the standing leg and a mating cavity is formed on the side wall wherein the mating protrusion is mated with the mating cavity.

18. The case of claim 15, wherein when the standing leg is in a closed position, substantial portion of the inner surface of the standing leg is in contact with the back portion of the soft protective case,
   wherein when the standing leg is in a closed position, the outer surface of the standing leg is substantially flush or co-planar with the back portion of the hard protective frame.

19. The case of claim 12, wherein the hard protective frame is made of polyvinyl chloride (PVC), titanium, aluminum, graphite composite, metal, plastic, or polycarbonate,
   wherein the soft protective cover is made of thermoplastic polyurethane.

\* \* \* \* \*